Oct. 17, 1967   K. R. JORDAN   3,347,749
MODIFIED CARBIDE FUELS
Filed Sept. 7, 1965   2 Sheets-Sheet 1

WITNESSES:
John L. Chopp
Lee P. Johns

INVENTOR
Kenneth R. Jordan
BY
Frederick Shapoe
ATTORNEY

Oct. 17, 1967 — K. R. JORDAN — 3,347,749
MODIFIED CARBIDE FUELS
Filed Sept. 7, 1965 — 2 Sheets-Sheet 2

United States Patent Office 3,347,749
Patented Oct. 17, 1967

3,347,749
MODIFIED CARBIDE FUELS
Kenneth R. Jordan, Monroeville, Pa., assignor to Westinghouse Electric Corporation, Pittsburgh, Pa., a corporation of Pennsylvania
Filed Sept. 7, 1965, Ser. No. 485,374
25 Claims. (Cl. 176—69)

This invention relates to nuclear fuel material and more particularly, it pertains to carbides of uranium, plutonium, thorium, and solid solution compounds thereof.

Uranium carbide and mixed carbides, such as (UPu)C, (ThPu)C, and (ThU)C, have several attractive features which recommend their use in power reactors. The high density of heavy metal atoms is desirable for breeder applications and the relatively high thermal conductivity of carbide fuels permits operation at high power densities. In order to utilize the latter advantage, the fuel is preferably bonded to an outer cladding tube of a fuel element by a liquid metal such as sodium or a sodium-potassium alloy (NaK).

One disadvantage of carbide fuels is the potential problem of incompatibility between the fuel and the cladding tube. For many applications, stainless steel is the preferred material for the cladding tubes. Due to the limitations of current fuel synthesis techniques, the fuel composition cannot be controlled sufficiently well to yield a stable single phase product. Small deviations of carbon content from stoichiometric proportions result in a product that contains either free metal or higher carbides, such as $MC_2$, or $M_2C_3$, where M is a heavy metal atom such as uranium, plutonium, or combinations thereof. For example, a stoichiometric carbide consists of UC; however, a hypostoichiometric carbide (which has a deficiency of carbon) consists of a mixture of U and UC. A hyperstoichiometric carbide (which contains too much carbon) consists of UC and $UC_2$. Similar examples can be cited for other elements including uranium and plutonium, which form solid solution compounds with the carbon.

With uranium carbide having less than 4.8 w/o carbon, there is an excess of free metal uranium in the matrix which can form an eutectic with the stainless steel cladding which melts at 1338° F. which is too low or marginal at best for satisfactory operation in a fuel element. With uranium carbide having more than 4.8 w/o carbon, uranium dicarbide ($UC_2$) forms which is attacked by the sodium. The reaction is as follows:

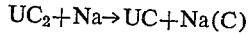

$$UC_2 + Na \rightarrow UC + Na(C)$$

where Na(C) denotes sodium containing carbon in solution.

Where the higher carbides are present in a fuel which is sodium bonded to stainless steel cladding tubes, the carbon in the fuel transfers through the sodium to the cladding material above about 1000° F. and consequent cladding embrittlement is observed. Thus, premature failure of the stainless steel cladding will occur. Where, however, free metal such as uranium exists, that is, where there is a deficiency of carbon, low melting eutectics with the stainless steel are formed. Compatibility of the fuel and the cladding therefore must be assured whereby there is no detrimental reaction, before the full economic and technical advantage of carbide fuels can be realized.

Prior attempts to develop carbide fuels which exhibit satisfactory compatibility with the cladding have generally been directed toward increasing the range of carbon contents over which the single phase can be synthesized. That is usually attempted by adding alloying elements such as zirconium which themselves form monocarbides that are stable over a range of compositions. Heretofore, no system has been identified which results in a single phase alloyed uranium or uranium-plutonium carbide containing reasonable amounts of alloying additions.

It has been found in accordance with this invention that modified carbide fuels may be provided which eliminate the operational limitations imposed by problems of fuel-cladding incompatibility of both hypostoichiometric (carbon deficient) and hyperstoichiometric (carbon excess) fuels and result in improved irradiation stability for the former. Secondary phases are provided in a given fuel element by the addition of suitable alloying additions. The amount and the nature of the addition are dictated to insure that phases are obtained that will not give up carbon to sodium or NaK or form low melting eutectics with stainless steel. That is, the presence of $MC_2$, $M_2C_3$, and M phases are avoided.

Accordingly, it is a principal object of this invention to provide a modified carbide nuclear fuel material which obviates or minimizes prior known difficulties.

It is another object of this invention to provide a modified carbide nuclear fuel material which avoids prior disadvantages of cladding embrittlement due to the migration of carbon from the fuel to the surrounding cladding tube.

It is a further object of this invention to provide a modified carbide nuclear fuel embodying predetermined proportion of chromium which avoids the incompatibility problem of forming low melting eutectics with stainless steel cladding tubes.

Other objects and advantages of the invention will become apparent hereinafter.

For a better understanding of the nature and objects of the invention, reference is made to the following detailed description and to the drawing in which.

Briefly, the present invention comprises the alloy of a nuclear metal carbide, such as uranium, plutonium or uranium-plutonium carbide, with small predetermined proportions of chromium or chromium carbide, or both. The chromium forms stable carbides, particularly $Cr_{23}C_6$, with any excess carbon. The resulting chromium-nuclear carbide alloys are compatible with stainless steel cladding with liquid metal bonding. The alloys are highly effective nuclear fuels and fuel elements made therefrom have a long life. Since small traces of oxygen and nitrogen are present, their effects are similar to that of carbon on an atom to atom basis. The term "effective carbon" denotes the total atoms of carbon, oxygen and nitrogen, or on a weight basis, converted to an equal number of carbon atoms.

More specifically, the invention comprises an improved nuclear fuel element comprising a stainless steel cladding or sheath, a body of fuel comprising an alloy of MC and chromium carbide with or without any chromium, and a liquid metal such as sodium or NaK disposed in the cladding and filling the space around the body of fuel.

Figures 4, 5:
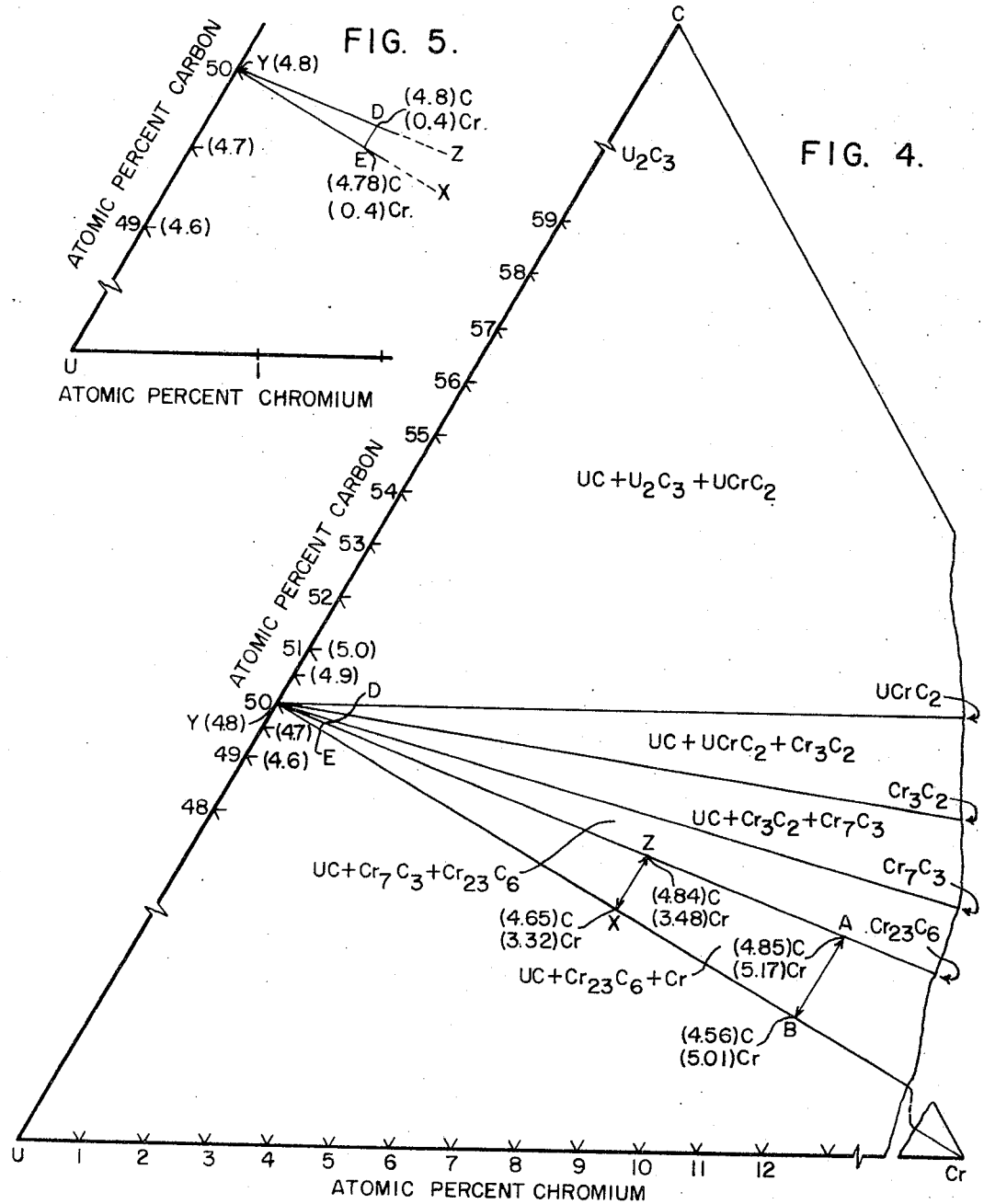
FIGURE 4 is a portion of the constitutional diagram of the ternary system of uranium, carbon, and chromium in atomic percentages, and showing weight percentages in parentheses.
FIGURE 5 is an enlarged portion of a part of the diagram of FIG. 4.

As a further specific embodiment of the present invention, a three-phase uranium base alloy with carbon and chromium is provided as is shown within the triangular area A–B–Y of FIG. 4. Though it is preferred to use as little chromium as possible in the alloy, there may be as much as about 5 w/o (11.25 atomic percent) chromium, where w/o is weight percent. Typical samples of the alloy may vary from 0.40 to 5.17 w/o chromium. For alloys having 0.40 w/o chromium, there may be from 4.78 to 4.8 w/o carbon and for alloys having from 5.01 to 5.17 w/o chromium the carbon may vary, respectively, from 4.56 to 4.85 w/o. For alloys having from 3.32 to 3.48 w/o chromium, the carbon content may vary respectively from 4.65 to 4.84 w/o. For plutonium and uranium-plutonium alloys, similar three phase proportions are produced.

Figures 1, 2, 3:
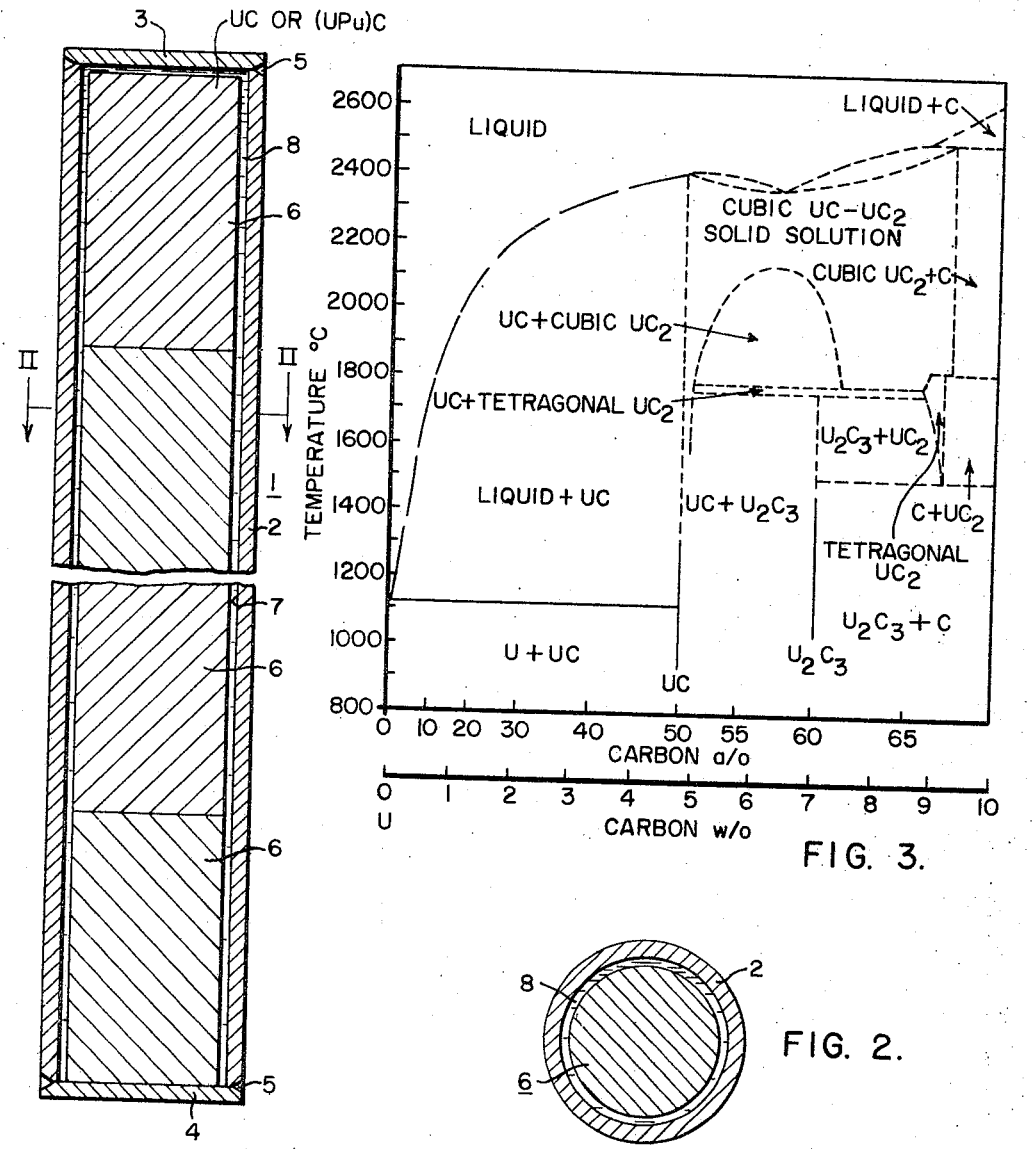
FIGURE 1 is a longitudinal sectional view through an elongated fuel element.
FIGURE 2 is a transverse sectional view taken on the line II—II of FIG. 1.
FIGURE 3 is a constitutional diagram of a part of the uranium-carbon system.

The three component alloy constituting the present invention may be used, among other things, as a fuel pellet such as in an elongated fuel element generally indicated in FIG. 1. Referring to FIGS. 1 and 2, the fuel element 1 includes an elongated tube 2 having end caps 3 and 4 attached thereto by similar welds 5. The tube 2 is preferably composed of stainless steel. Within the tube 2, a plurality of fuel pellets 6 are provided in end-to-end abutment within a chamber 7 provided by the tube.

As shown in FIG. 1, the diameter of the pellets is slightly less than that of the inner surface of the tube 2 thereby providing clearance of about 6 mils between the tube and the pellets. The clearance is filled with a liquid metal such as sodium or NaK which is sustained in a substantially stagnant status as a thermal bond.

The pellets 6 constitute the fuel by which a nuclear reactor is operated. Accordingly, the fuel may be composed of fissionable material such as uranium carbide, plutonium carbide, (UPu)C, (UTh)C, (PuTh)C, and the like.

In the past, uranium carbide and uranium plutonium carbide, UC and (UPu)C, have been used as monocarbide fuels. As shown in the phase diagram of FIG. 3 uranium carbide having 4.8 w/o carbon is an intermetallic compound of precise stoichiometric composition. Due to limitations of current synthesis techniques in this area, the binary compound composition cannot be controlled sufficiently well to yield an exact single phase product. Typical deviations of carbon content are about ±0.1 w/o carbon resulting in a product that contains significant amounts of higher carbides such as $MC_2$ or $M_2C_3$ on the one hand, or free metal M if carbon is deficient.

Because of the lack of control over the precise stoichiometric composition of these carbides, an alloying addition is made to insure the development of a three phase equilibrium composition thereby avoiding the development of the phases which create the previous problems of fuel-cladding incompatibility. The preferred alloying element is chromium, because of its ability to combine with carbon to form $Cr_{23}C_6$ which is a stable phase. In addition to the $Cr_{23}C_6$ phase, the alloy contains UC and Cr. The amounts of any chromium and/or chromium carbide addition, however, are not sufficient to affect detrimentally the satisfactory overall operation of a nuclear reactor.

The amount of the addition and the nature of the addition are chosen to insure that phases which will give up carbon to sodium or NaK, or which form low melting eutectics with stainless steel are not found in the carbide alloy fuel. In particular, the presence of $MC_2$, $M_2C_3$, and M phases, is avoided, where M is uranium, plutonium or UPu. Such additions take advantage of the fact that at some ternary compositions, MC is in equilibrium with two Cr and $Cr_{23}C_6$ phases which do not adversely effect compatibility with the cladding or the irradiation stability of the fuel. At the same time, allowance is made for variation of the carbon content of the fuel pellets.

A portion of the ternary system of uranium, carbon, and chromium is shown in FIG. 4 and an enlarged portion thereof in FIG. 5 in the vicinity of the UC composition to which additions of an alloying element such as chromium are made. As shown in the diagrams, a stoichiometric UC fuel composition contains 4.8 w/o carbon or 50 a/o (atomic percent) carbon. In the practice the supplier of UC produces any composition within ±0.1% C. The limiting composition which corresponds to typical pellet-to-pellet variations of ±0.1 w/o carbon from 4.9 w/o are shown at 50.0 and 51.05 a/o carbon points on the ternary diagram. Where no chromium addition is present, the fuel will consist of UC and $U_2C_3$ phases in equilibrium. However, the addition of about 3.4 w/o chromium is sufficient to insure that no $U_2C_3$ will be present in uranium carbide compositions containing carbon in the range specified by such minimum and maximum carbon contents. Thus, a random selection of pellets will exhibit the following structures represented between points X and Z on the ternary diagram:

Carbon content: Phases:
(1) Minimum 4.8 w/o ————— UC+Cr
(2) 4.8 w/o C<Carbon content
    <5.0 w/o C ————————— UC+Cr+$Cr_{23}C_6$
(3) Maximum 5.0 w/o C ————— UC+$Cr_{23}C_6$ As shown in FIGS. 4 and 5 the uranium carbide may contain as little as 0.4 w/o (about 0.95 a/o) chromium or as much as about 5.17 w/o (about 1.25 a/o) chromium. Where the supplier provides a UC fuel having an excess of carbon, such as 4.9 w/o carbon, enough chromium metal is added to bring the final fuel analysis within the triangular area A–B–Y of FIG. 4. Similarly, where the UC composition provided has a deficiency of carbon, such as 4.7 w/o carbon, chromium carbide ($Cr_{23}C_6$) is added in sufficient quantity to result in a basic UC analysis that is within the triangular area. In practice however, where the calculated additions of chromium and/or chromium carbide are made and the mixed powders are sintered to form a fuel pellet the resulting compositions are within the trapezoidal area A–B–D–E. A typical analysis may occur in a zone adjacent the line Z–X. These several points have compositions by weight as follows:

| Point | Carbon, percent | Chromium, percent |
| --- | --- | --- |
| A | 4.85 | 5.17 |
| B | 4.56 | 5.01 |
| C | 4.8 | 0.40 |
| D | 4.78 | 0.40 |
| E | 4.84 | 3.48 |
| Z | 4.65 | 3.32 |
| X | | |

To avoid the formation of free uranium metal, additions of an alloying chromium carbide may be made to obtain a three phase equilibrium that does not contain the undesirable free metal.

As an example, a typical analysis of a uranium carbide powder gives 4.45 w/o carbon with incidental impurities including 0.2 w/o oxygen, 0.01 w/o nitrogen, 0.03 w/o molybdenum, plus less than 500 p.p.m. of other elements. To this carbide about 3.6 w/o chromium carbide ($Cr_{23}C_6$) powder is added to obtain the desired pellet analysis. Where a pellet composed of uranium-plutonium carbide is used, the plutonium may vary from 15 to 20 w/o of the uranium.

Oxygen and nitrogen have effects on uranium or uranium-plutonium similar to carbon. Thus, the amounts of carbon added are indicated as effective carbon. The effective carbon content is the sum of the weight percentage of carbon, plus adjusted weight percentages of oxygen and nitrogen. For example, for a powder analysis having 4.6 w/o carbon, 0.2 w/o oxygen, and 0.07 w/o nitrogen the effective carbon content is 4.81 equivalent w/o carbon, calculated as follows:

| Actual Analysis | Multiplier [1] | Carbon Equivalent |
| --- | --- | --- |
| 4.6 C | 12/12 | 4.6 |
| 0.2 O | 12/16 | 0.15 |
| 0.07 N | 12/14 | +0.06 |
| Equivalent w/o carbon | | 4.81 |

[1] Where the multipliers are the ratios of atomic weights of each element divided into the atomic weight of carbon.

The following example is illustrative of the present invention:

Example

Uranium carbide powder having a hypostoichiometric analysis of 4.6 to 4.8 w/o carbon is mixed with a quantity of $Cr_{23}C_6$ so that the chromium added as $Cr_{23}C_6$, constitutes about 3.4 w/o of the total. The powder mixture is pressed into a compact pellet which is then sintered for three to four hours at a temperature ranging from 1400 to 1500° C. The resulting pellet is approximately 90 percent dense. A formula for the foregoing chemistry involved for hypostoichiometric carbon analysis of uranium carbide powder of varying carbon percentages is as follows:

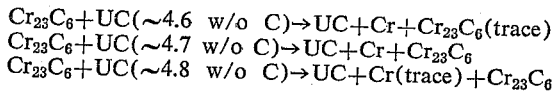

For hyperstoichiometric analysis of uranium carbide, the following formula pertains,

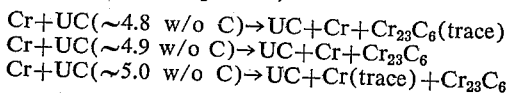

As shown above, the hypostoichiometric uranium carbide is mixed with chromium carbide ($Cr_{23}C_6$) for the purpose of adding additional carbon in order to avoid the presence of free uranium metal. In other words, the addition of $Cr_{23}C_6$ to the uranium carbide prior to sintering adds a sufficient amount of carbon to react with all free uranium which is not tied up with carbon as uranium carbide.

For hyperstoichiometric UC, unalloyed chromium is added to avoid the formation of $UC_2$ by forming the more stable $Cr_{23}C_6$.

$Cr_{23}C_6$ or chromium metal may be mixed, respectively, with hypostoichiometric or hyperstoichiometric monocarbide fuels, other than uranium carbide, such as PuC, or (UPu)C, where the parentheses indicate solid solution compounds.

Three other phase regions of potential interest in the M–C–Cr systems are those defined below. The required chromium addition and fuel dilution are based on carbon deviations of ±0.1 w/o. Smaller deviations would require proportionately smaller chromium additions. The list of three phase areas of interest of the various systems are tabulated in the table.

ond phases are more stable with respect to carbon transfer. Modification of carbide fuels to assure compositions which exhibit three phases in equilibrium, i.e. UC, $Cr_{23}C_6$, and Cr, rather than attainment of a single phase structure, is proposed as a method of enhancing fuel-cladding compatibility.

Moreover a specific system, namely, M–C–Cr, is apparently unique in that compositions can be realized in which all secondary phases are nonfissile phases and the modified fuel should therefore exhibit irradiation stability comparable to that of stoichiometric MC. The approximate amounts of alloying additions are shown in the table for the various systems of interest assuming a pellet-to-pellet variation in carbon content of ±0.1 weight percent about nominal composition.

Finally, the chromium addition not only improves the compatibility between the fuel and the cladding but also results in irradiation stability. There is also an incidental advantage of reduced sintering temperature.

It should be understood that the above description is only exemplary and not in limitation of the invention.

What is claimed is:

1. A ternary alloy consisting essentially by weight of 4.56 to 4.85% carbon, 0.40 to 5.17% chromium, and the balance consisting of an element selected from the group consisting of uranium metal, plutonium metal, and uranum-plutonium alloy.
2. The ternary alloy of claim 1 in which the uranium-plutonium alloy comprises from 15 to 30% plutonium.
3. The ternary alloy of claim 1 in which there is about 3.4% chromium.
4. The ternary alloy of claim 1 in which there is about 4.75% carbon.
5. The ternary alloy of claim 1 in which there is about 3.4% chromium and about 4.75% carbon.
6. The ternary alloy of claim 2 in which there is about 3.4% chromium.
7. The ternary alloy of claim 2 in which there is about 4.75% carbon.
8. The ternary alloy of claim 2 in which there is about 3.4% chromium and about 4.75% carbon.
9. The ternary alloy of claim 1 in which the uranium, chromium, and carbon compositions are within the area A–B–D–E of FIGURE 4 of the drawings.
10. The ternary alloy of claim 1 in which the uranium, chromium, and carbon compositions are on the line Z–X of FIGURE 4 of the drawings.

TABLE

| Weight, percent Cr | Secondary Phases | Systems | | | | Solidus, °C. | Secondary Phases, V/o |
|---|---|---|---|---|---|---|---|
| | | U | UPu | ThU | ThPu | | |
| 3.4 | $Cr_{23}C_6$ plus Cr | X | X | X | X | 1,315 | 6.4 |
| 5.3 | $Cr_7C_3$ plus $Cr_{23}C_6$ | X | X | X | X | <1,530 | 8.3 |
| 3.7 | $Cr_3C_2$ plus $Cr_7C_3$ | X | X | X | X | <1,680 | 11.1 |
| 2.6 | $MCrC_2$ plus $Cr_3C_2$ | X | | | | — | ~6 |

Where X denotes probable existence of three phase regions in system shown; — denotes insufficient information.

The irradiation stability in these three phase regions with the exception of the region in which $MCr_2$ is a secondary phase should be comparable to stoichiometric UC since the secondary phases are not fissile phases. The chromium additions appear to result in unique structures in this respect. Thermodynamic calculations and limited experimental results indicate that $Cr_{23}C_6$ is not attacked by sodium. The higher carbides of chromium are presumably less stable and carbon transfer should become increasingly probable at the higher carbon to chromium ratios in the carbides.

Accordingly, the present invention results in alloys having three phases which do not form low temperature eutectics with the cladding material, and have a lower tendency to carburize with the cladding because the sec- 11. A mixture containing, by weight, 4.56 to 4.85% carbon, 0.40 to 5.17% chromium, and the balance essentially M, composed of intimately intermixed particles selected from the group consisting of chromium, carbon, and compounds and alloys thereof, wherein M, represents one metal selected from the group consisting of U, Pu, and UPu.
12. A mixture containing particles selected from the group consisting of M, chromium, carbon, and compounds and alloys thereof, wherein M represents one metal selected from the group consisting of U, Pu, and UPu, and the composition of the mixture being within the area A–B–D–E of FIGURE 4 of the drawings.
13. The mixture of claim 11 wherein the UPu alloy comprises from 15 to 30% by weight of plutonium.

14. The mixture of claim 11 in which the total chromium is about 3.4% by weight.

15. The mixture of claim 11 in which there is about 4.75% by weight of total carbon.

16. The mixture of claim 11 in which there is about 4.75% by weight of total carbon and about 3.4% of total chromium.

17. The mixture of claim 13 in which there is 4.75% of total carbon.

18. The mixture of claim 13 in which there is about 3.4% of total chromium.

19. The mixture of claim 13 in which there is about 3.4% of total chromium and about 4.75% of total carbon.

20. A fuel element for a nuclear reactor comprising an elongated tube composed of a high temperature ferrous-base alloy, a plurality of pellets within the tube and having a composition of MC, Cr, and $Cr_{23}C_6$, wherein M denotes the heavy metal atoms of U, Pu, and UPu, the pellets having a diameter slightly less than and forming a clearance with the inner surface of the tube, and liquid metal occupying the clearance.

21. The fuel element of claim 20 in which there is from 4.56 to 4.85% by weight of total carbon and from 0.40 to 5.17% by weight of total chromium.

22. The fuel element of claim 20 in which the uranium-plutonium alloy comprises from 15 to 30% plutonium.

23. The fuel element of claim 20 in which there is about 3.4% chromium.

24. The fuel element of claim 20 in which there is about 4.75% carbon.

25. The fuel element of claim 20 in which there is about 3.4% of chrouimum and about 4.75% carbon.

References Cited

UNITED STATES PATENTS

| | | | |
|---|---|---|---|
| 2,526,805 | 10/1950 | Carter et al. | 75—122.7 X |
| 3,041,260 | 6/1962 | Goeddel | 176—89 X |
| 3,136,629 | 6/1964 | Williams et al. | 75—122.7 |
| 3,162,528 | 12/1964 | Williams et al. | 75—122.7 |
| 3,202,586 | 8/1965 | Webb et al. | 176—70 |
| 3,228,885 | 1/1966 | Barta et al. | 252—301.1 |
| 3,244,599 | 4/1966 | Hildebrand | 176—72 |

BENJAMIN R. PADGETT, *Primary Examiner.*

CARL D. QUARFORTH, *Examiner.*

M. J. SCOLNICK, *Assistant Examiner.*